United States Patent
Cocco et al.

(10) Patent No.: US 10,580,107 B2
(45) Date of Patent: *Mar. 3, 2020

(54) AUTOMATIC HARDWARE ZLW INSERTION FOR IPU IMAGE STREAMS

(71) Applicant: INTEL CORPORATION, Santa Clara, CA (US)

(72) Inventors: Mauro Cocco, Eindhoven (NL); Randy B. Osborne, Beaverton, OR (US); Alessandro Paschina, Eindhoven (NL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/961,526

(22) Filed: Apr. 24, 2018

(65) Prior Publication Data

US 2018/0239605 A1   Aug. 23, 2018

Related U.S. Application Data

(63) Continuation of application No. 15/280,772, filed on Sep. 29, 2016, now Pat. No. 9,983,877.

(51) Int. Cl.
*G06T 1/20* (2006.01)

(52) U.S. Cl.
CPC ............ *G06T 1/20* (2013.01); *G06T 2200/28* (2013.01)

(58) Field of Classification Search
CPC .... G06T 1/20; G06T 2200/28; G06F 9/30047
See application file for complete search history.

(56) References Cited

U.S. PATENT DOCUMENTS

| 6,578,114 | B2 | 6/2003 | Breuder et al. |
| 7,418,465 | B1 | 8/2008 | Lewis et al. |
| 9,983,877 | B2 * | 5/2018 | Cocco ................ G06T 1/20 |
| 2005/0071570 | A1 | 3/2005 | Takasugl et al. |
| 2006/0248279 | A1 | 11/2006 | Al-Sukhni et al. |
| 2008/0209127 | A1 | 8/2008 | Brokenshire et al. |
| 2016/0179699 | A1 | 6/2016 | Venkatasubramanian et al. |

OTHER PUBLICATIONS

PCT International Search Report, PCT Application No. PCT/US2017/048376, dated Nov. 29, 2017, 3 pages.

* cited by examiner

*Primary Examiner* — Maurice L. McDowell, Jr.
(74) *Attorney, Agent, or Firm* — International IP Law Group, P.L.L.C.

(57) ABSTRACT

A system for automatic hardware ZLW insertion for IPU image streams is described herein. The system includes a memory and a processor. The memory is to store imaging data. The processor is coupled to the memory. The processor is to receive an image stream request and determine a data transfer type. The processor is also to insert a zero length write (ZLW) instruction ahead of the image stream request in response to the image stream request beginning on a different page when compared to the current page in a page history. Additionally, the processor is to insert a ZLW instruction ahead of the image stream request in response to the image stream request crossing a page boundary.

25 Claims, 11 Drawing Sheets

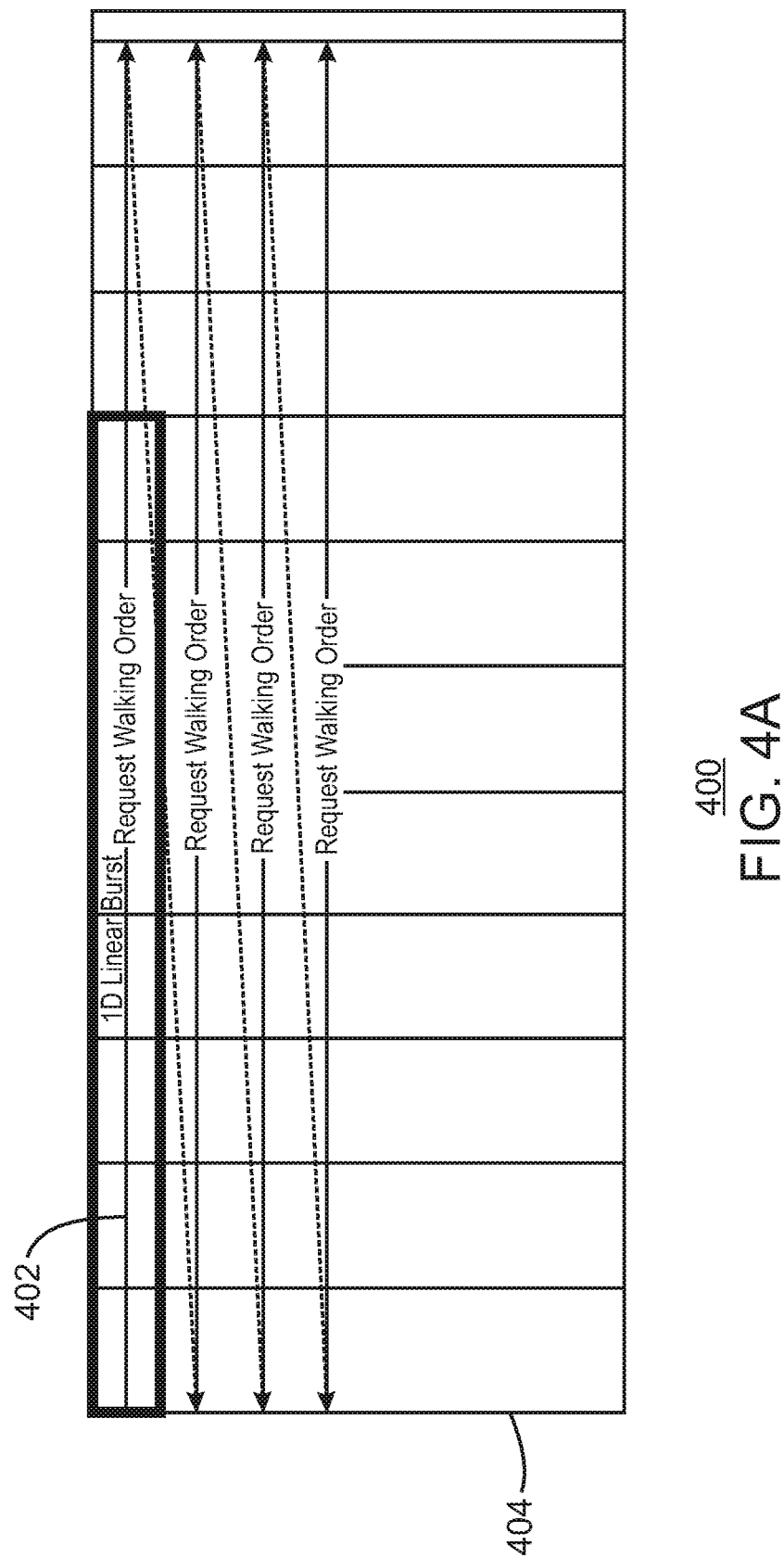

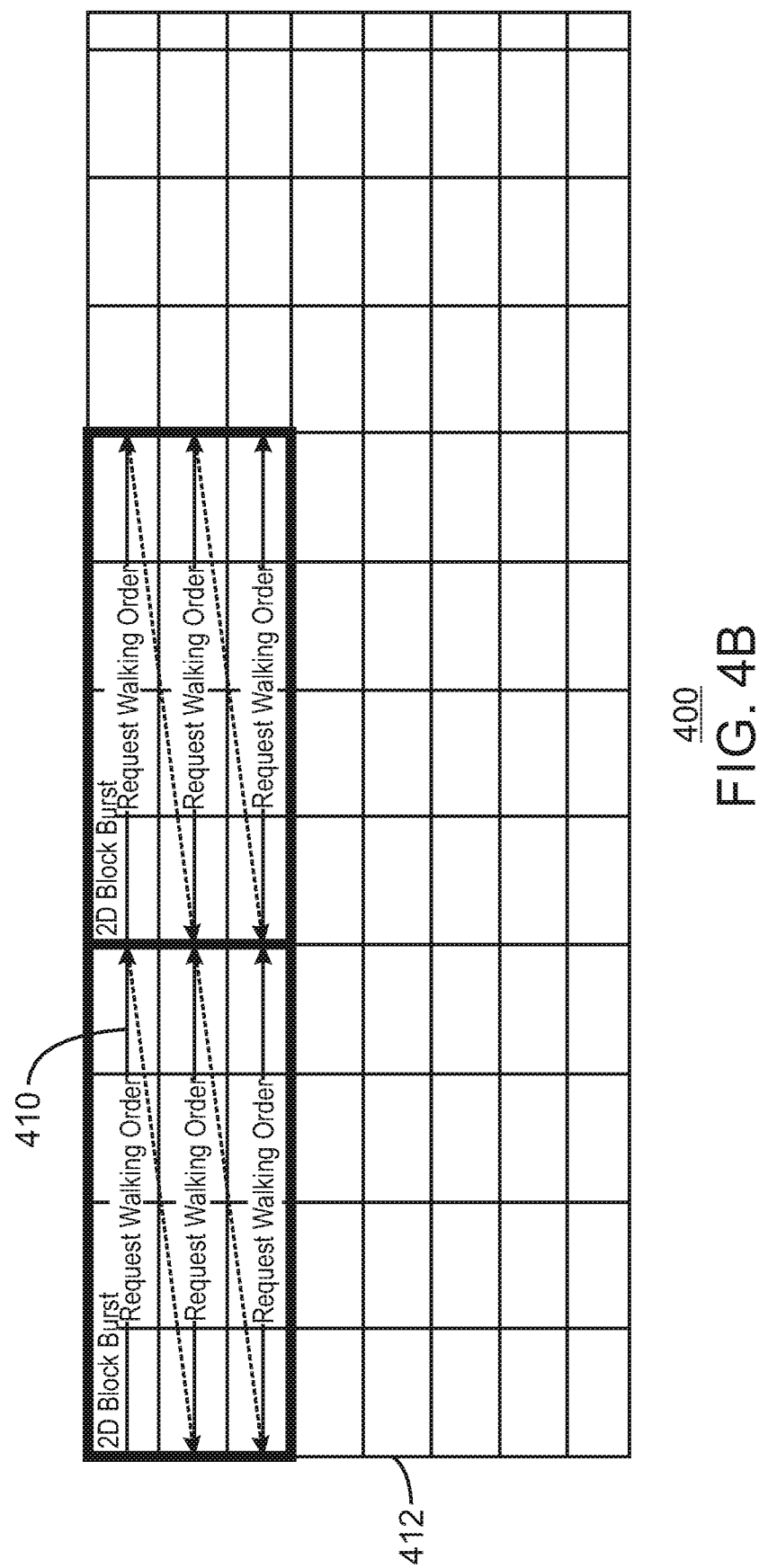

700

AUTOMATIC HARDWARE ZLW INSERTION FOR IPU IMAGE STREAMS

CROSS REFERENCE TO RELATED APPLICATION

The present application claims the benefit of the filing date of U.S. patent application Ser. No. 15/280,772, by Mauro Cocco et al., entitled "AUTOMATIC HARDWARE ZLW INSERTION FOR IPU IMAGE STREAMS," filed Sep. 29, 2016, and which is incorporated herein by reference.

BACKGROUND ART

An image processing unit (IPU) may be used to process multiple streams of input/output (I/O) data transfers. For example, on a typical video use case there are more than 25 different streams alive as the IPU receives and/or transmits imaging data. An input/output memory management unit (IOMMU) is a memory management unit (MMU) may connect a direct-memory-access (DMA) capable I/O bus to the main memory. The IOMMU can map virtual addresses to physical addresses, and the IOMMU can also cache translation pages associated with a transition look-aside buffer identification (TLB_ID) via a set of transition look-aside buffers (TLBs).

BRIEF DESCRIPTION OF THE DRAWINGS

FIG. 4A is an illustration of a walking order in a linear burst request on a frame of data FIG. 4B is an illustration of a walking order in a block burst request on a frame of data

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
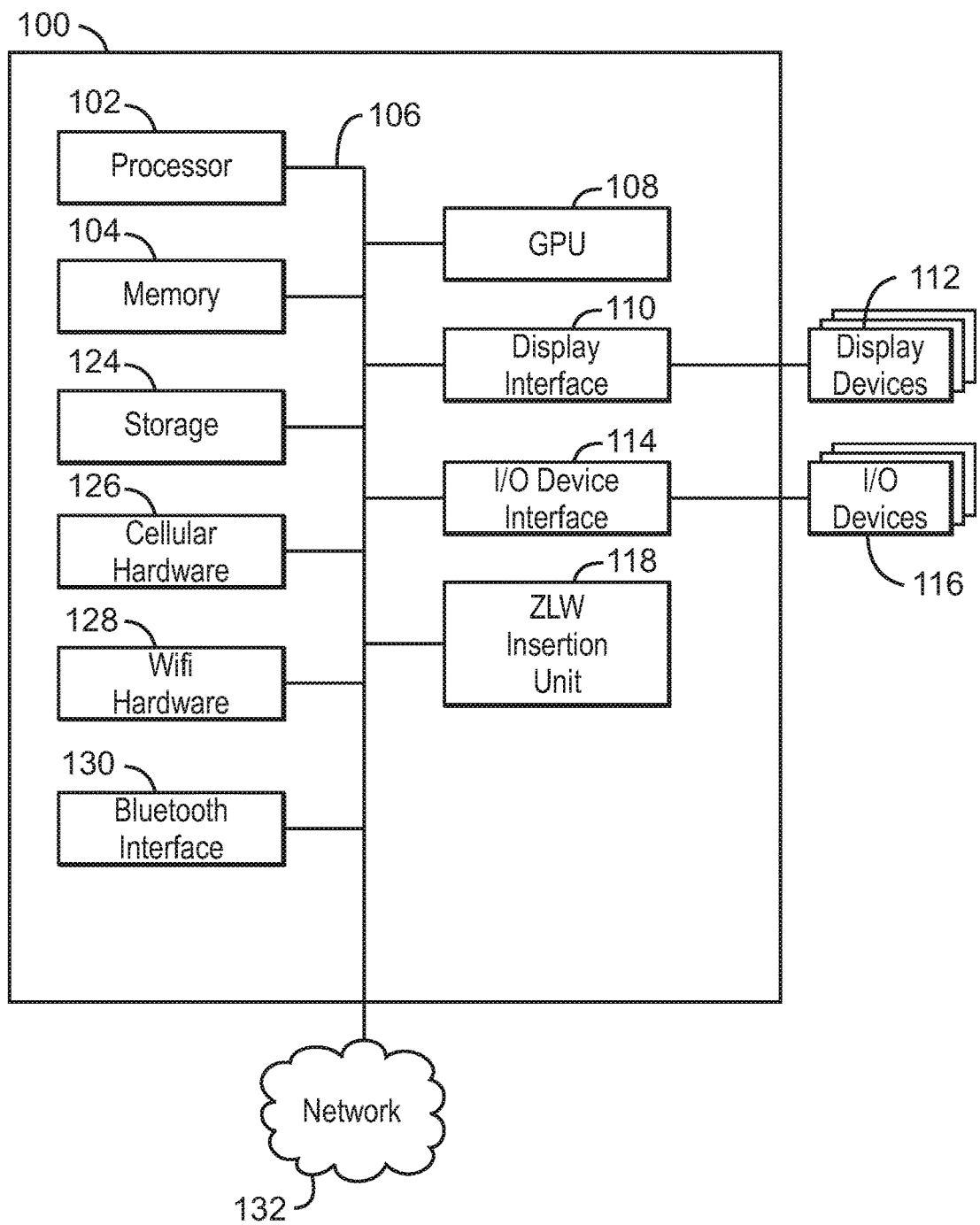
FIG. 1 is a block diagram of an electronic device that enables automatic hardware ZLW insertion for IPU image streams.

To eliminate performance lost due to IOMMU page misses, the IPU can pre-fetch the page address translation by issuing Zero Length Write (ZLW) instructions on an address falling in a page translation to pre-fetch ahead of the actual request to hide fetch penalty. A ZLW instruction is write request which does not carry data, hence it will be dropped after its address is translated by the IOMMU and it will not reach system memory. Accordingly, when the IPU pre-fetches the page address translation by issuing ZLW instructions on an address falling in a page translation to pre-fetch ahead of the actual request, the ZLW does not fetch the data in a page.

Embodiments described herein enable automatic hardware ZLW insertion for IPU image streams. In embodiments, an image stream request is received and used to determine a data transfer type. A zero length write (ZLW) instruction is inserted ahead of the image stream request in response to the image stream request beginning on a different page when compared to the current page in a page history. Additionally, a ZLW instruction is inserted ahead of the image stream request in response to the image stream request crossing a page boundary.

Some embodiments may be implemented in one or a combination of hardware, firmware, and software. Further, some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of an electronic device that enables automatic hardware ZLW insertion for IPU image streams. The electronic device 100 may be, for example, a laptop computer, tablet computer, mobile phone, smart phone, or a wearable device, among others. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random access memory (DRAM).

The electronic device 100 also includes a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, or the like, to be displayed to a user of the electronic device 100. In some embodiments, the GPU 108 includes a number of graphics engines, wherein each graphics engine is configured to perform specific graphics tasks, or to execute specific types of workloads. For example, the GPU 108 may include an engine that processes video data. In embodiments, the GPU 108 may be an IPU.

The CPU 102 can be linked through the bus 106 to a display interface 110 configured to connect the electronic device 100 to a display device 112. The display device 112 can include a display screen that is a built-in component of the electronic device 100. The display device 112 can also include a computer monitor, television, or projector, among others, that is externally connected to the electronic device 100.

The CPU 102 can also be connected through the bus 106 to an input/output (I/O) device interface 114 configured to connect the electronic device 100 to one or more I/O devices 116. The I/O devices 116 can include, for example, a keyboard and a pointing device, wherein the pointing device can include a touchpad or a touchscreen, among others. The I/O devices 116 can be built-in components of the electronic device 100, or can be devices that are externally connected to the electronic device 100.

The electronic device 100 also includes a hardware ZLW insertion unit 118 for inserting ZLW instructions in IPU I/O data streams. The hardware 118 autonomously inserts ZLW instruction(s) N pages ahead to pre-fetch page address translations by inspecting when one dimensional (1D) or two dimensional (2D) block data request is on a different page address from the previous request and/or when burst request will cross a page boundary. In embodiments, when conditions as described below are satisfied, then the hardware ZLW insertion unit 118 may insert a ZLW instruction prior to an address request. While the ZLW insertion unit 118 is illustrated as a separate component of the electronic device 100, several different configurations are possible. For example, the ZLW insertion unit 118 may be part of the GPU/IPU device and/or could also be part of other devices. Additionally, the ZLW insertion unit 118 can be seen as snooping the transaction generate by IPU/GPU and inserting the ZLW request when required accordingly to the described techniques.

The electronic device 100 may also include a storage device 124. The storage device 124 is a physical memory such as a hard drive, an optical drive, a flash drive, an array of drives, or any combinations thereof. The storage device 124 can store user data, such as audio files, video files, audio/video files, and picture files, among others. The storage device 124 can also store programming code such as device drivers, software applications, operating systems, and the like. The programming code stored to the storage device 124 may be executed by the CPU 102, GPU 108, or any other processors that may be included in the electronic device 100.

The CPU 102 may be linked through the bus 106 to cellular hardware 126. The cellular hardware 126 may be any cellular technology, for example, the 4G standard (International Mobile Telecommunications-Advanced (IMT-Advanced) Standard promulgated by the International Telecommunications Union-Radio communication Sector (ITU-R)). In this manner, the PC 100 may access any network 132 without being tethered or paired to another device, where the network 132 is a cellular network.

The CPU 102 may also be linked through the bus 106 to WiFi hardware 128. The WiFi hardware is hardware according to WiFi standards (standards promulgated as Institute of Electrical and Electronics Engineers' (IEEE) 802.11 standards). The WiFi hardware 128 enables the electronic device 100 to connect to the Internet using the Transmission Control Protocol and the Internet Protocol (TCP/IP), where the network 132 is the Internet. Accordingly, the electronic device 100 can enable end-to-end connectivity with the Internet by addressing, routing, transmitting, and receiving data according to the TCP/IP protocol without the use of another device. Additionally, a Bluetooth Interface 130 may be coupled to the CPU 102 through the bus 106. The Bluetooth Interface 130 is an interface according to Bluetooth networks (based on the Bluetooth standard promulgated by the Bluetooth Special Interest Group). The Bluetooth Interface 130 enables the electronic device 100 to be paired with other Bluetooth enabled devices through a personal area network (PAN). Accordingly, the network 132 may be a PAN. Examples of Bluetooth enabled devices include a laptop computer, desktop computer, ultrabook, tablet computer, mobile device, or server, among others.

The block diagram of FIG. 1 is not intended to indicate that the electronic device 100 is to include all of the components shown in FIG. 1. Rather, the computing system 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

An IPU may be used to ensure efficient image data transmission and reception. The IPU may provide connectivity various graphics devices and any associated memories. In embodiments, the IPU may also be responsible for image processing and manipulation according to various power saving schemes. Image processing may require multiple streams of I/O data transfers. For example, on a typical video use case may be more than twenty-five different imaging streams alive.

Figure 2:
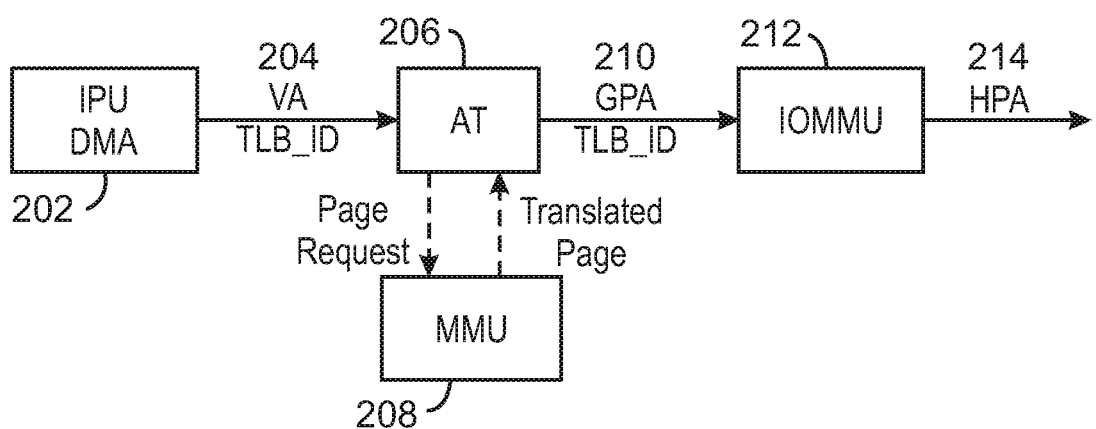
FIG. 2 is a block diagram illustrating an IPU DMA request translation.

FIG. 2 is a block diagram illustrating an IPU DMA request translation. During image processing, data for processing may be stored in a main memory. An IPU DMA unit 202 may be used to access data stored in the main memory. IPU image stream requests are issued on a Virtual Address (VA) space 204 and pass through an Address Translator (AT) 206 to convert them into a Guest Physical Address (GPA) 210 by an internal IPU MMU 208. Each stream request belongs to a stream and it has an associated TLB_ID. On systems without memory virtualization, a GPA address is the real physical address. On systems with memory virtualization, a request on GPA is then translated into Host Physical Address (HPA) 214 by IOMMU 212. An HPA 214 address is the real physical address.

Figure 3:
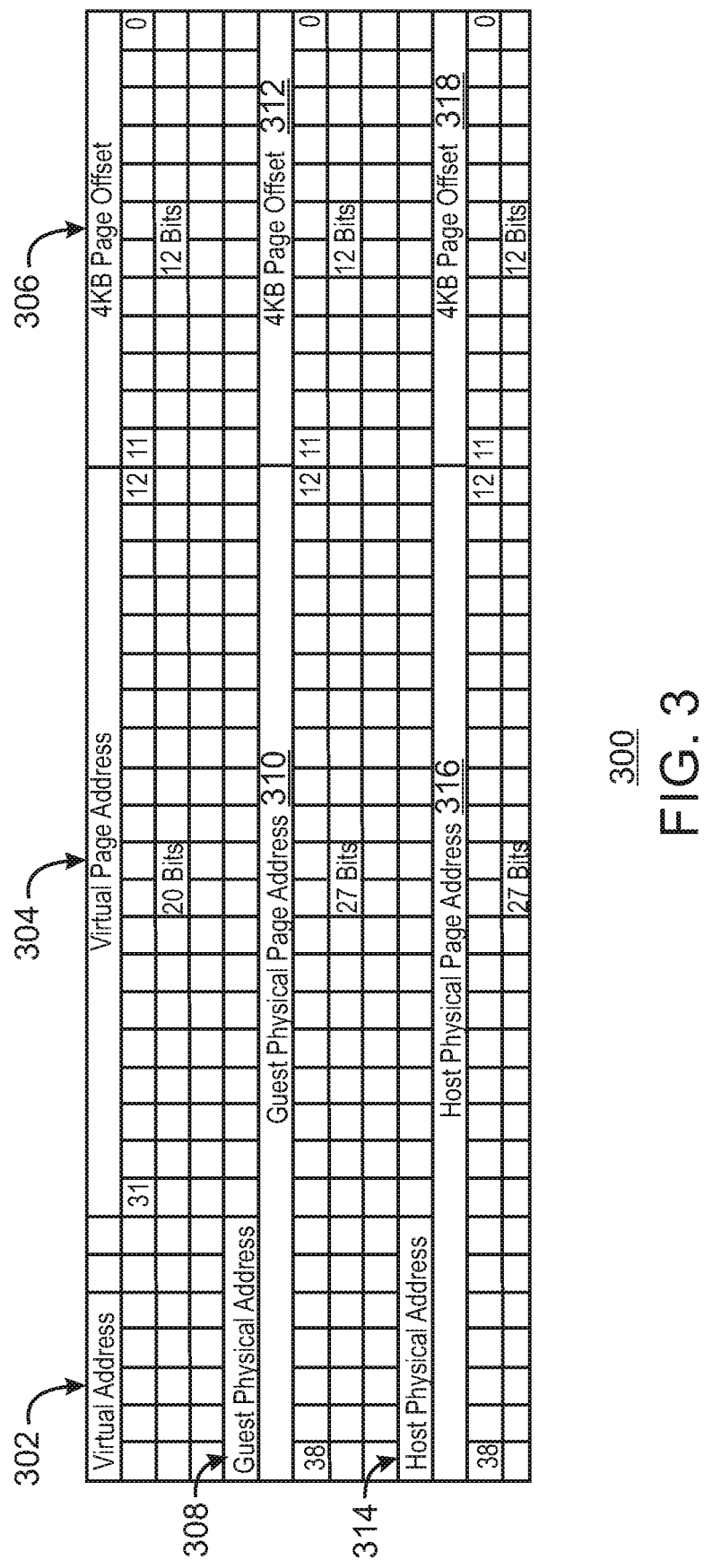
FIG. 3 is an illustration of a translation from a virtual address, to a guest physical address, to a host physical address.

FIG. 3 is an illustration of a translation 300 from a virtual address, to a guest physical address, to a host physical address. In FIG. 3, given a page size such as 4 KB, a request address can be split into 2 fields—a page offset and a page address. The page offset may be stored at bits [11, . . . , 0] for a 4 KB page. The page address may be stored at bits [31, . . . , 12] for 4 KB page, with a VA capacity of 4 GB. The virtual address 302 may be twenty bits of a virtual page address 304 and twelve bits of a page offset 306. The guest physical address 308 may be twenty-seven bits of a guest physical page address 310 and twelve bits of a page offset 312. The host physical address 314 may be twenty-seven bits of a host physical page address 316 and twelve bits of a page offset 318. A translation of a request from an address space 302, 308, or 314 to another is a lookup table (LUT)/conversion of the page address field. In particular, VA 304 to GPA 310 for MMU and GPA 310 to HPA 314 for the IOMMU.

The complete page address translation tables are stored in system memory and they are partially cached in MMU and IOMMU on demand. When another request on the same page address is received, it will then hit in the cache. When a request is received on a new page which is not cached, the IOMMU is said to miss the page and it will fetch the translation page and cache the translation page.

The IOMMU has a set of TLBs dedicated for caching translation pages associated to a TLB_ID. To eliminate performance lost due to IOMMU page misses, the IPU will pre-fetch the page address translation (but not the data in a page) issuing ZLW instructions on an address falling in the page translation to pre-fetch ahead of the actual request to hide fetch penalty. In embodiments, the ZLW instruction is a write request which does not carry data, hence it will be dropped after its address is translated by the IOMMU and it will not reach system memory.

In embodiments, dedicated IPU hardware autonomously inserts ZLW instructions for image buffer to avoid performance lost on systems with virtualized memory due to IOMMU page misses. This hardware autonomously inserts ZLW instruction(s) N pages ahead to pre-fetch page address translation (but not the data) by inspecting when 1D or 2D block data request is on a different page address (e.g. falling on a different 4 KB page) from the previous request and/or when burst request will cross a page boundary. In embodiments, the hardware is a controller that is hardwired for ZLW insertion. As used herein, hardwired refers the controller being wired for a single purpose, and logic circuits of the controller are customized to that single purpose.

Traditional solutions require firmware intervention to introduce ZLW interleaved with a DMA request. Due to the high bandwidth and multiple streams alive during image processing, synchronization of firmware ZLW insertion with DMA pipelined commands is not possible without steplocking DMA transfers and heavily loading the firmware. As used herein, steplocking refers to preventing the execution of additional instructions until a current instruction is complete. Heavily loading the firmware refers to causing a large number of different tasks to be executed by the firmware, thereby slowing down the rate at which instructions can be processed due to the sheer number of instructions. The traditional firmware based solution thus reduces IPU performance and will degrade key performance indicators.

The types of data transfer executed by the IPU DMA may be referred to as a 1D linear burst or a 2D block burst. FIG. 4A is an illustration of a data request walking order in a linear burst request 400A on a frame of data. The data requested is memory mapped such that the data request (read or write) is at a specific address. As used herein, the walking order refers to a path that is traversed across data in memory in order to retrieve and transfer the data. As illustrated by the path 402, data blocks 404 are accessed in a linear fashion. As used herein, the burst request refers to accessing the data in a sequential data transfer at a maximum throughput. In embodiments, the 1D linear burst accesses data in a raster scanner order. FIG. 4B is an illustration of a walking order in a 2D block burst request 400B on a frame of data. As illustrated by the path 410, data blocks 412 are accessed in a block fashion.

For 1D linear burst 400A, during VA to GPA conversion the AT recognizes the TLB_ID and inspects two conditions. First, when the address request begins on the same page as the previous request issued on the same TLB_ID, a comparison with page history is performed. The page history is updated with the last page request for each stream associated to a TLB_ID. Second, the AT determines if the current request is a burst request crossing a page boundary. If at least one of the two conditions above is satisfied then AT will insert a ZLW before the request is passed.

To be effective a ZLW instruction is issued at N pages ahead of the current request. The value of N depends on the stream throughput and IOMMU TLB set configuration and IOMMU replacement policy. The general formula to calculate N when sharing a TLB for M streams walking at the same pace is:

$$TLB_{ID} \leq M*(2N+1)$$

Figure 5:
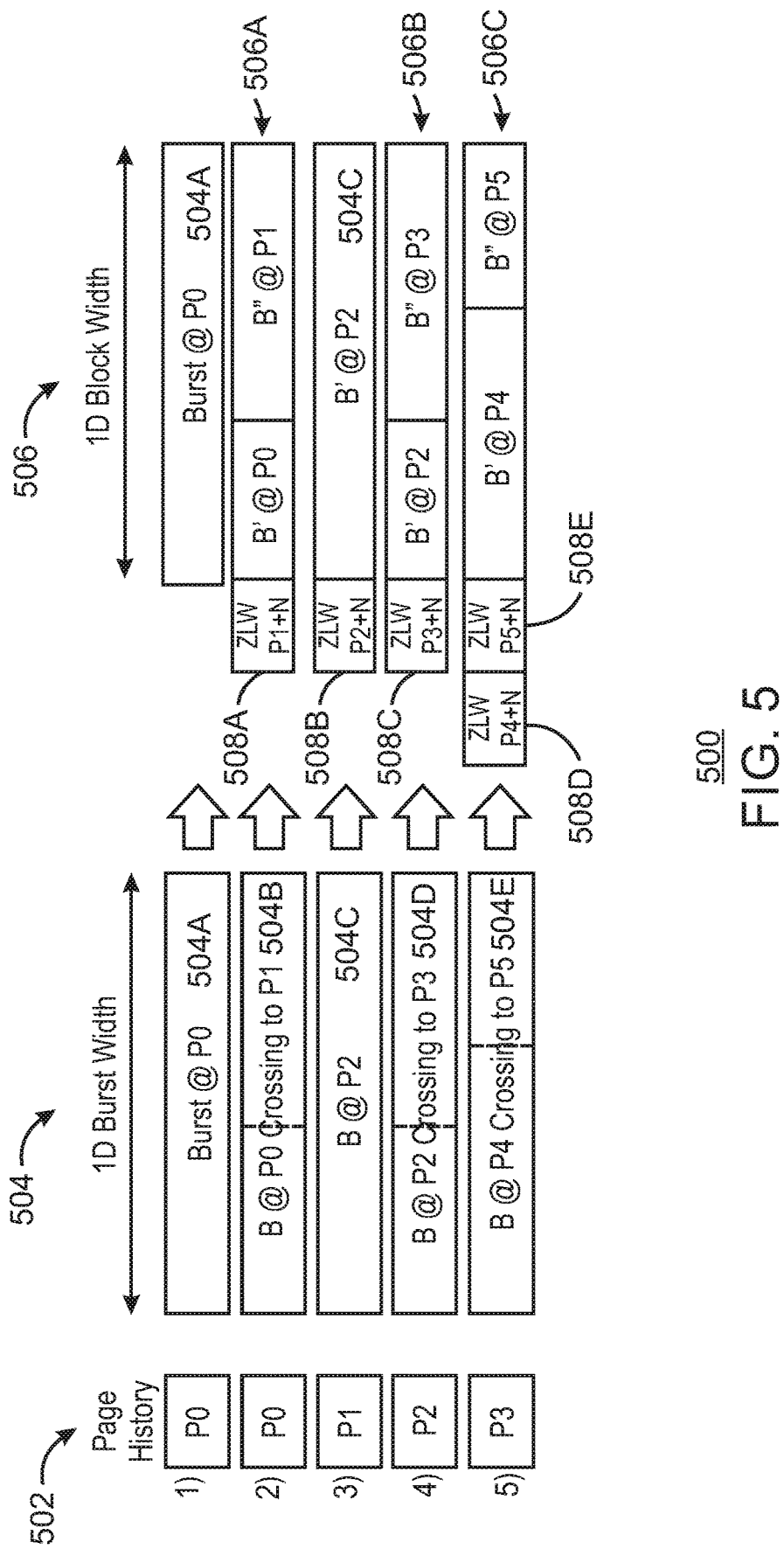
FIG. 5 is an illustration of ZLW insertion for different 1D linear burst cases.

For example, for one set (8 pages) per TLB for Y stream, N will be set between 2 and 3; for U and V streams N will be set to 1. FIG. 5 illustrates if, when and how the AT will insert ZLW for the five possible combinations of page history and 1D linear stream requests.

FIG. 5 is an illustration of ZLW insertion for different 1D linear burst cases. At case 502, a 1D linear request starts on the same page of the previous request. The request does not cross page boundary. At case 502, no ZLW insertion required. At case 504, a 1D linear request starts on the same page of the previous request. The request crosses page boundary (P0 to P1). One ZLW is inserted N pages ahead of the crossed page (P1). At case 506, a 1D linear request starts on the different page of the previous request. The request does not cross page boundary. Here, one ZLW is inserted N pages ahead of the page of the request (P2). At case 508, a 1D linear request starts on the different page of the previous request. The request crosses a page boundary (P2 to P3). One ZLW is inserted N pages ahead of the crossed page (P3). Finally, a 1D linear request starts on the different page of the previous request. The request crosses page boundary (P4 to P5). One ZLW is inserted N pages ahead of the page of the request (P4) 1 ZLW inserted N pages ahead of the crossed page (P5). In embodiments, a 1D linear stream single word request are special cases of case 502 and case 506 described above. In this scenario, the ZLW would be inserted for case 506 only.

Figure 6A:
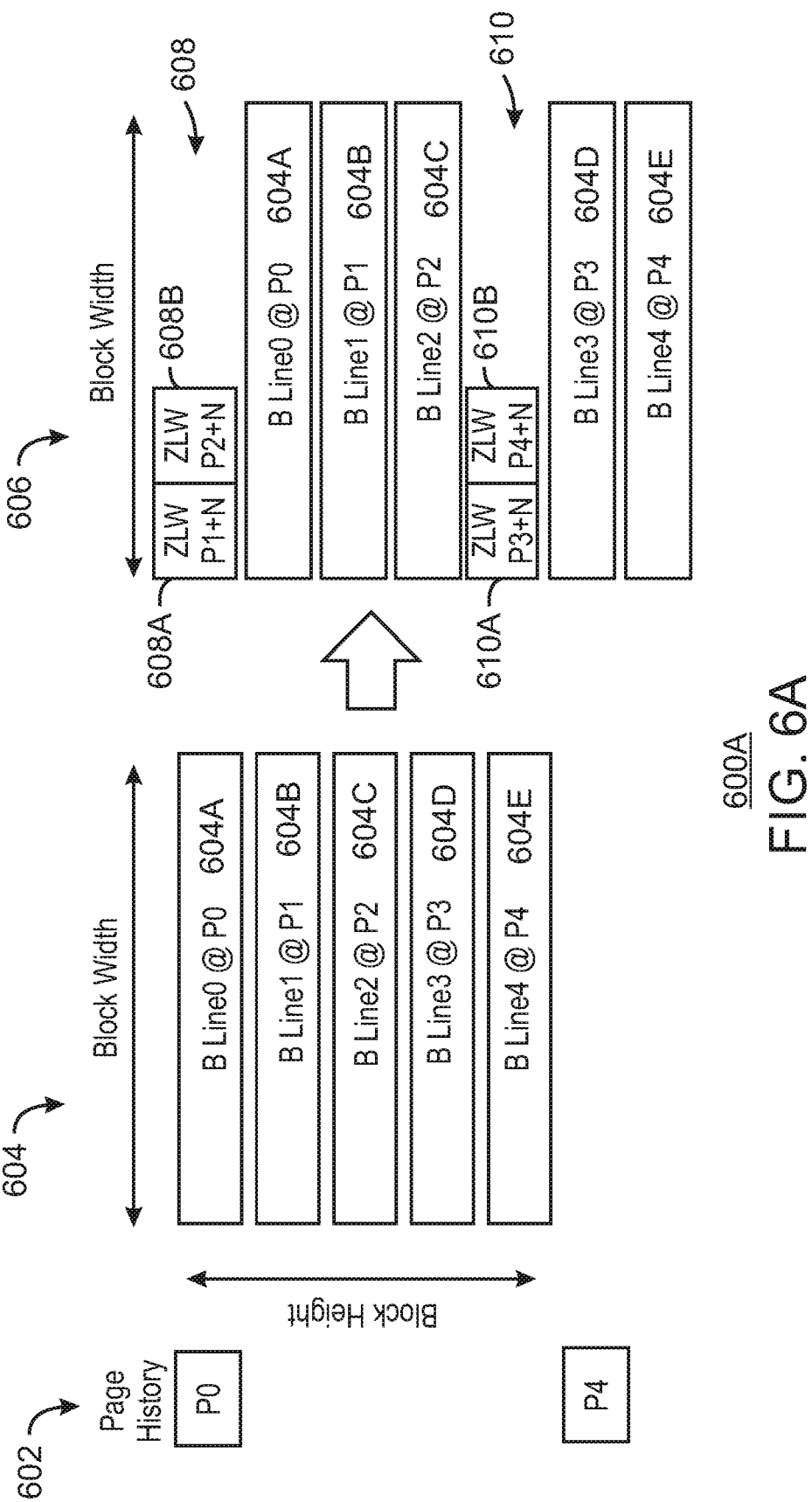
FIG. 6A is an illustration of ZLW insertion for 2D block burst starting on the same 4 KB page as the history page.
Figure 6B:
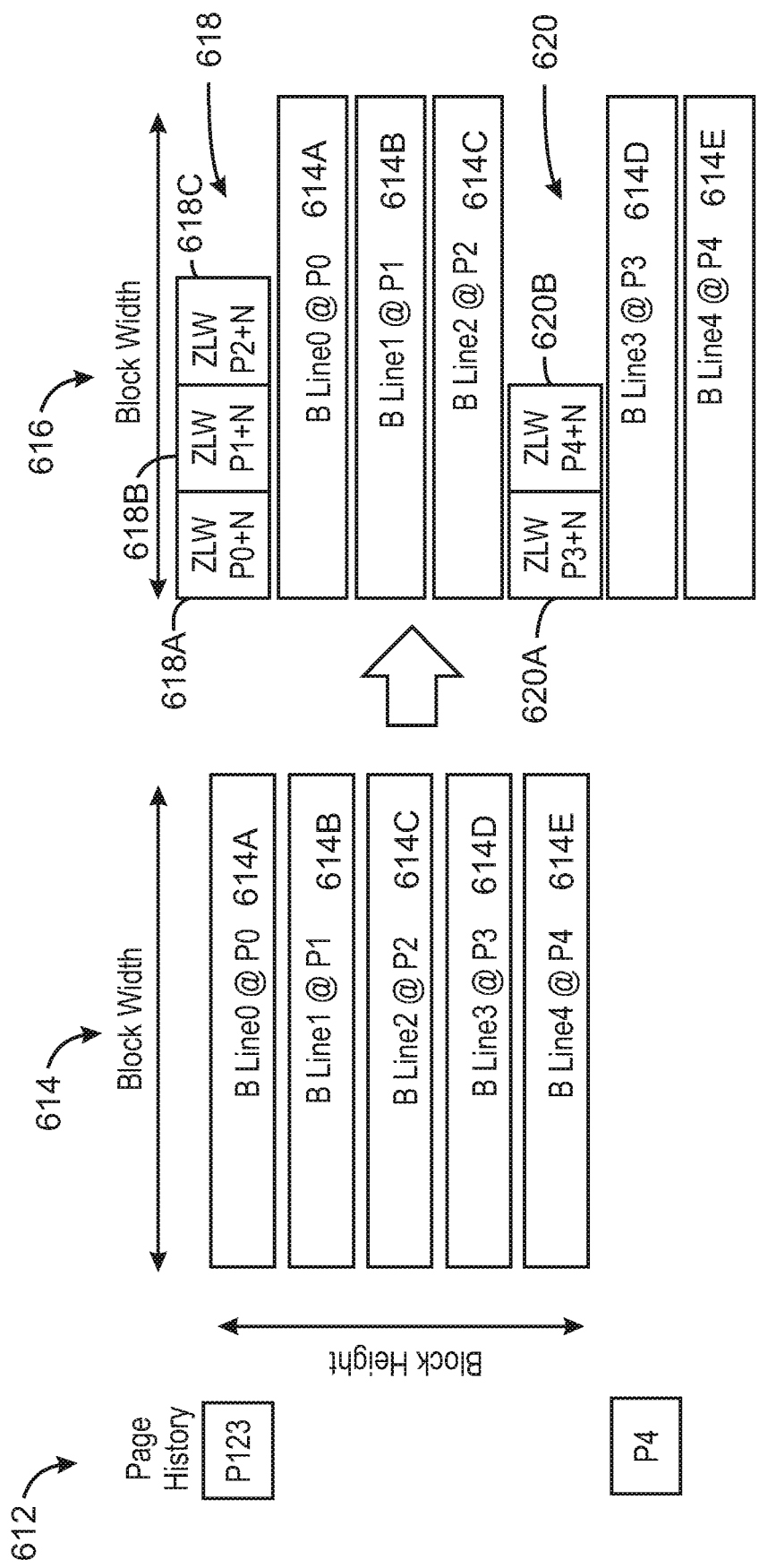
FIG. 6B is an illustration of ZLW insertion for a 2D Block burst starting on a different 4 KB page as the history page.
Figure 6C:
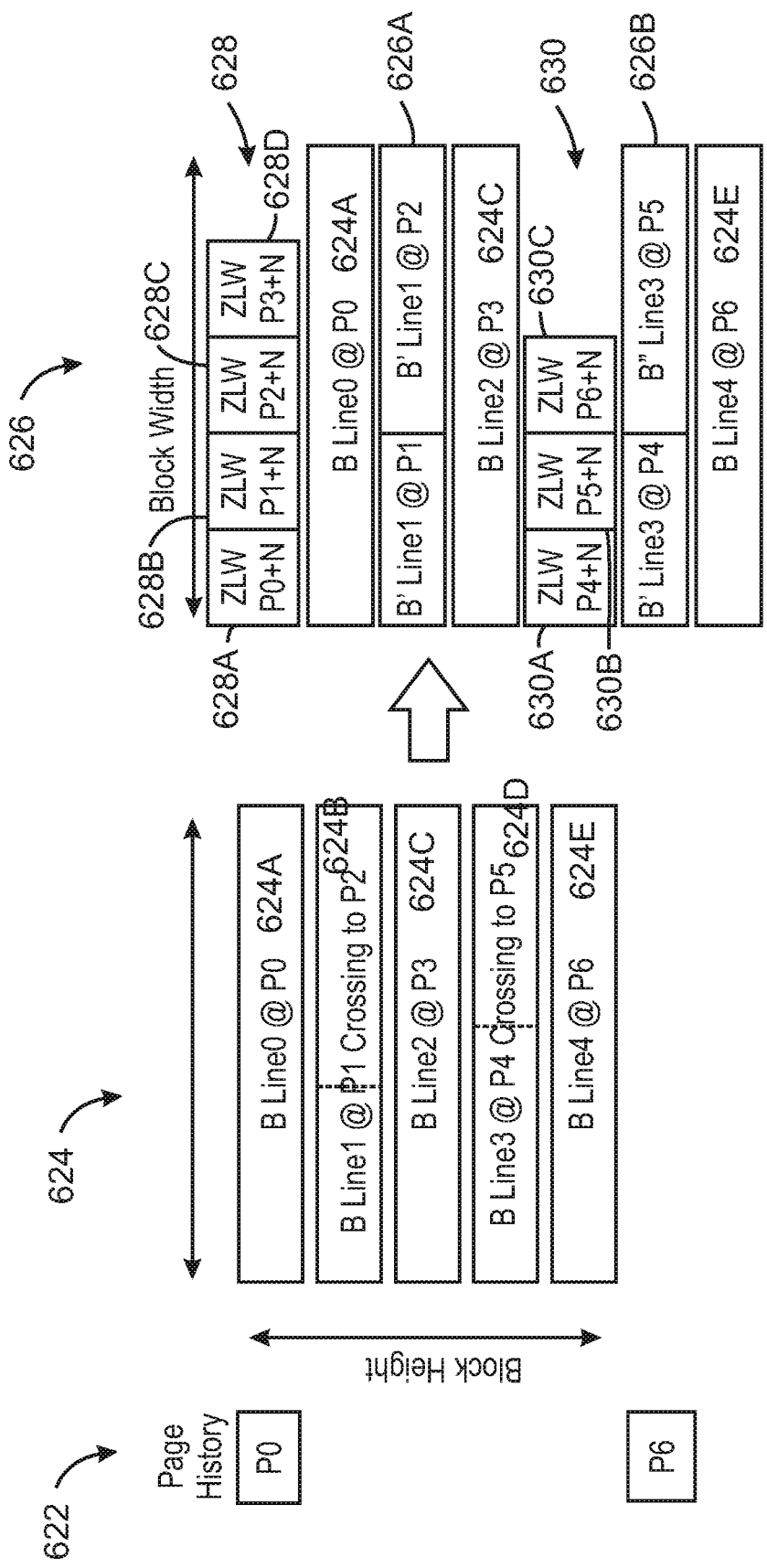
FIG. 6C is an illustration of ZLW insertion for 2D block burst starting on the same 4 KB page as the history page and with 4 KB page crossing on some lines.

For a 2D block burst, during the VA to GPA conversion the AT recognizes the TLB_ID and inspects two conditions. First, if the request is on the same page as the previous request issued on the same TLB_ID, a comparison with page history is performed. The page history is updated with the last page request for each stream associated to a TLB_ID. Second, the AT determines if the current request is crossing a page boundary. When at least one of the 2 conditions above is satisfied then AT will insert ZLW instruction(s) before the data request is passed as shown in FIGS. 6A-6C for a 2D request of five lines with different begin pages values and crossing pages. Moreover, the AT will interleave ZLW and data request accordingly to a configurable maximum back-to-back ZLW request. However, this is required to not occupy all the IOMMU page walkers to serve ZLW instructions. To simplify hardware implementation, the configurable maximum number of back-to-back ZLW insert could be extended by +½ extra ZLW if a line crosses 2 or more pages. That is, the maximum ZLW back-to-back ZLW insertion is not a hard fix threshold.

FIG. 6A is an illustration of ZLW insertion for 2D block burst starting on the same 4 KB page as the history page. A maximum back-to-back ZLW request value is set to three. In FIG. 6A, the 2D block burst request is directed to addresses that start on the same page as the current page in the page history 602. The page history 602 is automatically updated with the last page request for each stream. The page requests 604 may include a number of address requests 604A . . . 604E. In FIG. 6A, the ZLW insertion occurs due to the maximum back-to-back ZLW request values. No pages are crossed in the requests 604, so no pre-fetching is performed due to potential page misses. Instead, here ZLW insertion is a result of the maximum back-to-back ZLW request, which in the example of FIG. 6A is set to three. As illustrated in FIG. 6A, the requests 604 are modified as illustrated by the requests 606. The requests 606 include a ZLW insertions 608 and ZLW insertions 610. The ZLW insertions 608 includes a ZLW 608A and a ZLW 608B. The ZLW insertions 610 includes a ZLW 610A and a ZLW 610B.

As illustrated in FIG. 6A, the ZLW 608A causes a page P1+N to be pre-fetched and the ZLW 608B causes a page P2+N to be pre-fetched. Here, the AT has interleaved the ZLWs 608A and 608B to satisfy the maximum back to back ZLW request. Similarly, the ZLW 610A causes a page P3+N to be pre-fetched and the ZLW 610B causes a page P4+N to be pre-fetched. Again, the AT has interleaved the ZLWs 610A and 610B to satisfy the maximum back to back ZLW request.

FIG. 6B is an illustration of ZLW insertion for a 2D Block burst starting on a different 4 KB page as the history page. A maximum back-to-back ZLW request value is set to three. In FIG. 6B, the 2D block burst request is directed to addresses that start on a different page as the current page in the page history 612. The page history 612 is automatically updated with the last page request for each stream. The page requests 614 may include a number of address requests 614A . . . 614E. In FIG. 6B, the ZLW insertion occurs due to the new starting page as well as the maximum back-to-back ZLW request values. No pages are crossed by the requests 614. Instead, here ZLW insertion is a result of the new page and the maximum back-to-back ZLW request, which in the example of FIG. 6B is set to three. As illustrated in FIG. 6B, the requests 614 are modified as illustrated by the requests 616. The requests 616 include a ZLW insertions 618 and ZLW insertions 620. The ZLW insertions 618 includes a ZLW 618A, ZLW 618B, and a ZLW 618C. The ZLW insertions 620 includes a ZLW 620A and a ZLW 620B.

As illustrated in FIG. 6B, the ZLW 618A causes a page P0+N to be pre-fetched and the ZLW 618B causes a page P1+N to be pre-fetched. The ZLW 618C causes a page P2+N to be pre-fetched. Here, the AT has interleaved the ZLWs 618B and 618C to satisfy the maximum back to back ZLW request. The ZLW 618A is due to the requests 614A starting on a completely different page from the current page request in the page history. Similarly, the ZLW 620A causes a page P3+N to be pre-fetched and the ZLW 620B causes a page P4+N to be pre-fetched. At ZLW 620, the AT has interleaved the ZLWs 620A and 620B to satisfy the maximum back to back ZLW request.

FIG. 6C is an illustration of ZLW insertion for 2D block burst starting on the same 4 KB page as the history page and with 4 KB page crossing on some lines. A maximum back-to-back ZLW request value is set to three. In FIG. 6C, the 2D block burst request is directed to addresses that start on the same page as the current page in the page history 622. However, some page requests cross to another page in the page requests 624. The page history 622 is automatically updated with the last page request for each stream. The page requests 624 may include a number of address requests 624A . . . 624E. In FIG. 6C, the ZLW insertion occurs due to the new starting page for some lines as well as the maximum back-to-back ZLW request values. Accordingly, ZLW insertion sequence is a result of the new page and the maximum back-to-back ZLW request, which in the example of FIG. 6C is set to three. As illustrated in FIG. 6A, the requests 624 are modified as illustrated by the requests 626. The requests 626 include a ZLW insertions 628, ZLW insertions 630, pre-fetch 626A, and pre-fetch 626B. The ZLW insertions 628 includes a ZLW 628A, ZLW 628B, ZLW 628C, and ZLW 628D. The ZLW insertions 630 includes a ZLW 630A, ZLW 630B, and ZLW 630C.

As illustrated in FIG. 6C, the ZLW 628A causes a page P0+N to be pre-fetched and the ZLW 628B causes a page P1+N to be pre-fetched. The ZLW 628C causes a page P2+N to be pre-fetched, and the ZLW 628D causes a page P3+N to be pre-fetched. Similarly, the ZLW 630A causes a page P4+N to be pre-fetched, the ZLW 630B causes a page P5+N to be pre-fetched, and the ZLW 630C causes a page P6+N to be pre-fetched. As shown the AT has interleaved data request 626A and 626B with ZLW insertion (630A, 630B and 630C) to satisfy the maximum back-to-back ZLW request configuration. To simplify HW implementation, the configurable maximum number of back-to-back ZLW insert could be extended by +½ extra ZLW if a line crosses 2 or more pages. That is the maximum ZLW back-to-back ZLW insertion is not a hard fix threshold. In FIG. 6C in fact the first sequence of ZLW insertion contains four ZLW requests (628A, 628B, 628C and 628D) although the maximum back-to-back ZLW request was set to 3.

Figure 7:
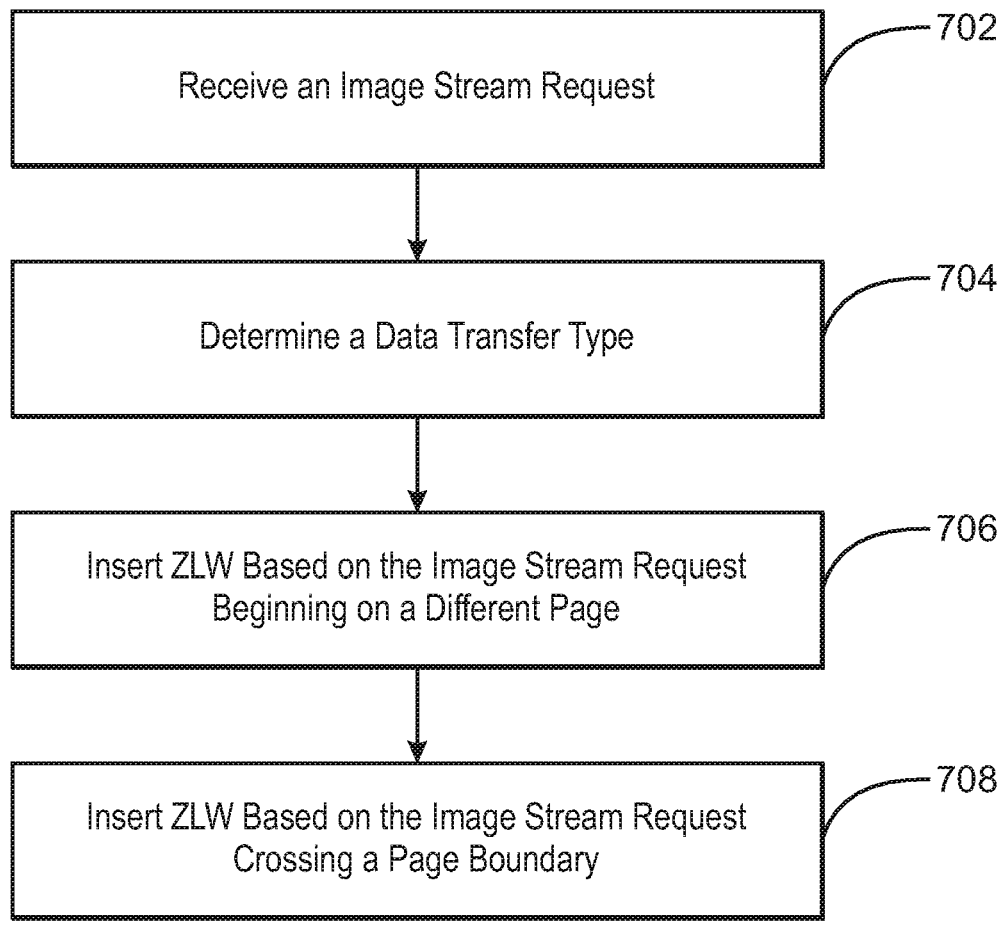
FIG. 7 is a process flow diagram of a method for automatic hardware ZLW insertion for IPU image streams.

FIG. 7 is a process flow diagram of a method for automatic hardware ZLW insertion for IPU image streams. At block 702, an image stream request is received. At block

704, a data transfer type is determined based on the image stream request. At block 706, in response to the image stream request beginning on a different page as a previous request in a page history, a hardware ZLW insertion is issued ahead of the image stream request. In embodiments, the hardware ZLW insertion is issued N pages ahead of the image stream request. At block 708, in response to the image stream request crossing a page boundary when compared to a previous request in a page history, a hardware ZLW insertion is issued ahead of the image stream request.

Figure 8:
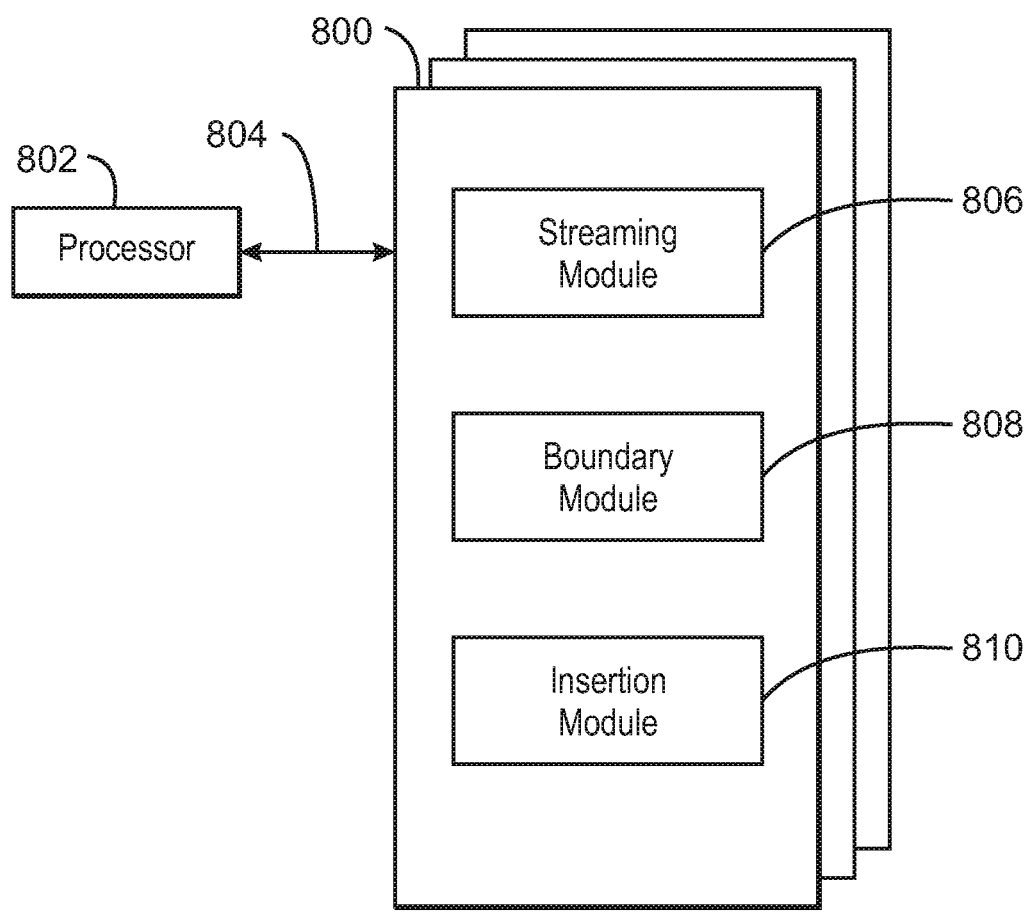
FIG. 8 is a block diagram showing media that contains logic for automatic hardware ZLW insertion for IPU image streams.

FIG. 8 is a block diagram showing media 800 that contains logic for automatic hardware ZLW insertion for IPU image streams. The media 800 may be a computer-readable medium, including a non-transitory medium that stores code that can be accessed by a processor 802 over a computer bus 804. For example, the computer-readable media 800 can be volatile or non-volatile data storage device. The media 800 can also be a logic unit, such as an Application Specific Integrated Circuit (ASIC), a Field Programmable Gate Array (FPGA), or an arrangement of logic gates implemented in one or more integrated circuits, for example.

The media 800 may include modules 806-810 configured to perform the techniques described herein. For example, a streaming module 806 may be configured to receive an image stream request. A boundary module 808 may be configured to determine if the image stream request beginning on a different page as a previous request in a page history, or if the image stream request beginning on a same page as a previous request in a page history crosses a page boundary. An insertion module 810 may be configured insert a hardware ZLW instruction based on results from the boundary module 808. In some embodiments, the modules 806-810 may be modules of computer code configured to direct the operations of the processor 802.

The block diagram of FIG. 8 is not intended to indicate that the media 800 is to include all of the components shown in FIG. 8. Further, the media 800 may include any number of additional components not shown in FIG. 8, depending on the details of the specific implementation.

Example 1 is a system. The system includes a memory configured to store imaging data; and a processor coupled to the memory, the processor to: receive an image stream request; determine a data transfer type; in response to the image stream request beginning on a different page when compared to the current page in a page history, insert a zero length write (ZLW) instruction ahead of the image stream request based on the data transfer type; and in response to the image stream request crossing a page boundary, insert a ZLW instruction ahead of the image stream request based on the data transfer type.

Example 2 includes the system of example 1, including or excluding optional features. In this example, the ZLW instruction is to cause a page address translation to be pre-fetched.

Example 3 includes the system of any one of examples 1 to 2, including or excluding optional features. In this example, the ZLW instruction is to cause a page address translation to be pre-fetched, wherein the ZLW instruction is inserted by hardware.

Example 4 includes the system of any one of examples 1 to 3, including or excluding optional features. In this example, the ZLW instruction is issued N pages ahead of the image stream request.

Example 5 includes the system of any one of examples 1 to 4, including or excluding optional features. In this example, the ZLW instruction is issued N pages ahead of the image stream request, wherein the value of N is based on an image stream throughput.

Example 6 includes the system of any one of examples 1 to 5, including or excluding optional features. In this example, the ZLW instruction is issued N pages ahead of the image stream request, wherein the value of N is based on a look-aside buffer configuration.

Example 7 includes the system of any one of examples 1 to 6, including or excluding optional features. In this example, the ZLW instruction is issued N pages ahead of the image stream request, wherein the value of N is based on an IOMMU replacement policy.

Example 8 includes the system of any one of examples 1 to 7, including or excluding optional features. In this example, the data transfer type is a 1D linear burst.

Example 9 includes the system of any one of examples 1 to 8, including or excluding optional features. In this example, the data transfer type is a 2D block burst.

Example 10 includes the system of any one of examples 1 to 9, including or excluding optional features. In this example, the ZLW instruction is a write request that does not carry data.

Example 11 is a method. The method includes receiving an image stream request; determining a data transfer type; inserting a zero length write (ZLW) instruction ahead of the image stream request in response to the image stream request beginning on a different page when compared to the current page in a page history based on the data transfer type; and inserting a ZLW instruction ahead of the image stream request in response to the image stream request crossing a page boundary based on the data transfer type.

Example 12 includes the method of example 11, including or excluding optional features. In this example, the ZLW instruction is to cause a page address translation to be pre-fetched.

Example 13 includes the method of any one of examples 11 to 12, including or excluding optional features. In this example, the ZLW instruction is to cause a page address translation to be pre-fetched, wherein the ZLW instruction is inserted by hardware.

Example 14 includes the method of any one of examples 11 to 13, including or excluding optional features. In this example, the ZLW instruction is issued N pages ahead of the image stream request.

Example 15 includes the method of any one of examples 11 to 14, including or excluding optional features. In this example, the ZLW instruction is issued N pages ahead of the image stream request, wherein the value of N is based on an image stream throughput.

Example 16 includes the method of any one of examples 11 to 15, including or excluding optional features. In this example, the ZLW instruction is issued N pages ahead of the image stream request, wherein the value of N is based on a look-aside buffer configuration.

Example 17 includes the method of any one of examples 11 to 16, including or excluding optional features. In this example, the ZLW instruction is issued N pages ahead of the image stream request, wherein the value of N is based on an IOMMU replacement policy.

Example 18 includes the method of any one of examples 11 to 17, including or excluding optional features. In this example, the data transfer type is a 1D linear burst.

Example 19 includes the method of any one of examples 11 to 18, including or excluding optional features. In this example, the data transfer type is a 2D block burst.

Example 20 includes the method of any one of examples 11 to 19, including or excluding optional features. In this example, the ZLW instruction is a write request that does not carry data.

Example 21 is an apparatus. The apparatus includes a controller to receive an image stream request; a ZLW insertion unit to determine a data transfer type, and in response to the image stream request beginning on a different page when compared to the current page in a page history, insert a zero length write (ZLW) instruction ahead of the image stream request based on the data transfer type, and in response to the image stream request crossing a page boundary, insert a ZLW instruction ahead of the image stream request based on the data transfer type.

Example 22 includes the apparatus of example 21, including or excluding optional features. In this example, the ZLW instruction is to cause a page address translation to be pre-fetched.

Example 23 includes the apparatus of any one of examples 21 to 22, including or excluding optional features. In this example, the ZLW instruction is to cause a page address translation to be pre-fetched, wherein the ZLW instruction is inserted by hardware.

Example 24 includes the apparatus of any one of examples 21 to 23, including or excluding optional features. In this example, the ZLW instruction is issued N pages ahead of the image stream request.

Example 25 includes the apparatus of any one of examples 21 to 24, including or excluding optional features. In this example, the ZLW instruction is issued N pages ahead of the image stream request, wherein the value of N is based on an image stream throughput.

Example 26 includes the apparatus of any one of examples 21 to 25, including or excluding optional features. In this example, the ZLW instruction is issued N pages ahead of the image stream request, wherein the value of N is based on a look-aside buffer configuration.

Example 27 includes the apparatus of any one of examples 21 to 26, including or excluding optional features. In this example, the ZLW instruction is issued N pages ahead of the image stream request, wherein the value of N is based on an IOMMU replacement policy.

Example 28 includes the apparatus of any one of examples 21 to 27, including or excluding optional features. In this example, the data transfer type is a 1D linear burst.

Example 29 includes the apparatus of any one of examples 21 to 28, including or excluding optional features. In this example, the data transfer type is a 2D block burst.

Example 30 includes the apparatus of any one of examples 21 to 29, including or excluding optional features. In this example, the ZLW instruction is a write request that does not carry data.

Example 31 is at least one machine readable medium comprising a plurality of instructions that. The computer-readable medium includes instructions that direct the processor to receive an image stream request; determine a data transfer type; insert a zero length write (ZLW) instruction ahead of the image stream request in response to the image stream request beginning on a different page when compared to the current page in a page history based on the data transfer type; and insert a ZLW instruction ahead of the image stream request in response to the image stream request crossing a page boundary based on the data transfer type.

Example 32 includes the computer-readable medium of example 31, including or excluding optional features. In this example, the ZLW instruction is to cause a page address translation to be pre-fetched.

Example 33 includes the computer-readable medium of any one of examples 31 to 32, including or excluding optional features. In this example, the ZLW instruction is to cause a page address translation to be pre-fetched, wherein the ZLW instruction is inserted by hardware.

Example 34 includes the computer-readable medium of any one of examples 31 to 33, including or excluding optional features. In this example, the ZLW instruction is issued N pages ahead of the image stream request.

Example 35 includes the computer-readable medium of any one of examples 31 to 34, including or excluding optional features. In this example, the ZLW instruction is issued N pages ahead of the image stream request, wherein the value of N is based on an image stream throughput.

Example 36 includes the computer-readable medium of any one of examples 31 to 35, including or excluding optional features. In this example, the ZLW instruction is issued N pages ahead of the image stream request, wherein the value of N is based on a look-aside buffer configuration.

Example 37 includes the computer-readable medium of any one of examples 31 to 36, including or excluding optional features. In this example, the ZLW instruction is issued N pages ahead of the image stream request, wherein the value of N is based on an IOMMU replacement policy.

Example 38 includes the computer-readable medium of any one of examples 31 to 37, including or excluding optional features. In this example, the data transfer type is a 1D linear burst.

Example 39 includes the computer-readable medium of any one of examples 31 to 38, including or excluding optional features. In this example, the data transfer type is a 2D block burst.

Example 40 includes the computer-readable medium of any one of examples 31 to 39, including or excluding optional features. In this example, the ZLW instruction is a write request that does not carry data.

Example 41 is an apparatus. The apparatus includes instructions that direct the processor to a controller to receive an image stream request; a means to determine a data transfer type, and in response to the image stream request beginning on a different page when compared to the current page in a page history, insert a zero length write (ZLW) instruction ahead of the image stream request based on the data transfer type, and in response to the image stream request crossing a page boundary, insert a ZLW instruction ahead of the image stream request based on the data transfer type.

Example 42 includes the apparatus of example 41, including or excluding optional features. In this example, the ZLW instruction is to cause a page address translation to be pre-fetched.

Example 43 includes the apparatus of any one of examples 41 to 42, including or excluding optional features. In this example, the ZLW instruction is to cause a page address translation to be pre-fetched, wherein the ZLW instruction is inserted by hardware.

Example 44 includes the apparatus of any one of examples 41 to 43, including or excluding optional features. In this example, the ZLW instruction is issued N pages ahead of the image stream request.

Example 45 includes the apparatus of any one of examples 41 to 44, including or excluding optional features. In this example, the ZLW instruction is issued N pages ahead of the image stream request, wherein the value of N is based on an image stream throughput.

Example 46 includes the apparatus of any one of examples 41 to 45, including or excluding optional features. In this example, the ZLW instruction is issued N pages ahead of the image stream request, wherein the value of N is based on a look-aside buffer configuration.

Example 47 includes the apparatus of any one of examples 41 to 46, including or excluding optional features. In this example, the ZLW instruction is issued N pages ahead of the image stream request, wherein the value of N is based on an IOMMU replacement policy.

Example 48 includes the apparatus of any one of examples 41 to 47, including or excluding optional features. In this example, the data transfer type is a 1D linear burst.

Example 49 includes the apparatus of any one of examples 41 to 48, including or excluding optional features. In this example, the data transfer type is a 2D block burst.

Example 50 includes the apparatus of any one of examples 41 to 49, including or excluding optional features. In this example, the ZLW instruction is a write request that does not carry data.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system, comprising:
a memory configured to store imaging data; and
a processor coupled to the memory, the processor to:
receive an image stream request;
determine a data transfer type; and
in response to the image stream request crossing a page boundary, insert a ZLW instruction ahead of the image stream request based on the data transfer type.

2. The system of claim 1, wherein the ZLW instruction is to cause a page address translation to be pre-fetched.

3. The system of claim 1, wherein the ZLW instruction is to cause a page address translation to be pre-fetched, wherein the ZLW instruction is inserted by hardware.

4. The system of claim 1, wherein the ZLW instruction is issued N pages ahead of the image stream request.

5. The system of claim 1, wherein the ZLW instruction is issued N pages ahead of the image stream request, wherein the value of N is based on an image stream throughput.

6. The system of claim 1, wherein the ZLW instruction is issued N pages ahead of the image stream request, wherein the value of N is based on a look-aside buffer configuration.

7. The system of claim 1, wherein the ZLW instruction is issued N pages ahead of the image stream request, wherein the value of N is based on an IOMMU replacement policy.

8. The system of claim 1, wherein the data transfer type is a one dimensional (1D) linear burst.

9. The system of claim 1, wherein the data transfer type is a two dimensional (2D) block burst.

10. The system of claim 1, wherein the ZLW instruction is a write request that does not carry data.

11. A method, comprising:
receiving an image stream request;
determining a data transfer type; and
inserting a zero length write (ZLW) instruction ahead of the image stream request in response to the image stream request beginning on a different page when compared to a current page in a page history based on the data transfer type.

12. The method of claim 11, wherein the ZLW instruction is to cause a page address translation to be pre-fetched.

13. The method of claim 11, wherein the ZLW instruction is to cause a page address translation to be pre-fetched, wherein the ZLW instruction is inserted by hardware.

14. The method of claim 11, wherein the ZLW instruction is issued N pages ahead of the image stream request.

15. The method of claim 11, wherein the ZLW instruction is issued N pages ahead of the image stream request, wherein the value of N is based on an image stream throughput.

16. An apparatus, comprising:
a controller to receive an image stream request;
a processor to determine a data transfer type, and in response to the image stream request beginning on a different page when compared to a current page in a page history, insert a zero length write (ZLW) instruction ahead of the image stream request based on the data transfer type.

17. The apparatus of claim 16, wherein the ZLW instruction is to cause a page address translation to be pre-fetched.

18. The apparatus of claim 16, wherein the ZLW instruction is to cause a page address translation to be pre-fetched, wherein the ZLW instruction is inserted by hardware.

19. The apparatus of claim 16, wherein the ZLW instruction is issued N pages ahead of the image stream request.

20. The apparatus of claim 16, wherein the ZLW instruction is issued N pages ahead of the image stream request, wherein the value of N is based on an image stream throughput.

21. At least one non-transitory machine readable medium comprising a plurality of instructions that, in response to being executed on a computing device, cause the computing device to:
receive an image stream request;
determine a data transfer type; and
insert a zero length write (ZLW) instruction ahead of the image stream request in response to the image stream request beginning on a different page when compared to the current page in a page history based on the data transfer type.

22. The machine readable medium of claim 21, wherein the ZLW instruction is issued N pages ahead of the image stream request, wherein the value of N is based on a look-aside buffer configuration.

23. The machine readable medium of claim 21, wherein the ZLW instruction is issued N pages ahead of the image stream request, wherein the value of N is based on an IOMMU replacement policy.

24. The machine readable medium of claim 21, wherein the data transfer type is a one dimensional (1D) linear burst.

25. The machine readable medium of claim 21, wherein the data transfer type is a two dimensional (2D) block burst.

\* \* \* \* \*